Figure 1:
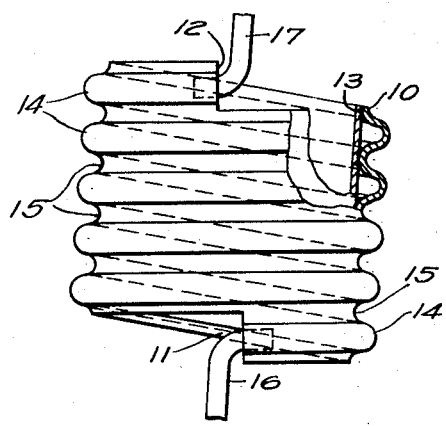

Nov. 15, 1938.

J. W. DAWSON 2,137,044

COOLING JACKET FABRICATION

Filed April 7, 1937

WITNESSES:
E. A. McCloskey.
R. W. Bailey

INVENTOR
John W. Dawson.
BY
F. W. Leyh
ATTORNEY

Patented Nov. 15, 1938

2,137,044

UNITED STATES PATENT OFFICE 2,137,044

COOLING JACKET FABRICATION

John W. Dawson, East McKeesport, Pa., assignor to Westinghouse Electric & Manufacturing Company, East Pittsburgh, Pa., a corporation of Pennsylvania Application April 7, 1937, Serial No. 135,484

1 Claim. (Cl. 29—157.3)

My invention relates to cooling jacket fabrication, and especially to cooling jacket fabrication for electron discharge devices.

An object of my invention is to provide a simplified structure for cooling jacket fabrication that lends itself to quantity production methods and at the same time provides means to provide adequate velocity of the cooling medium and also is adaptable to special fitting requirements.

Figure 2:
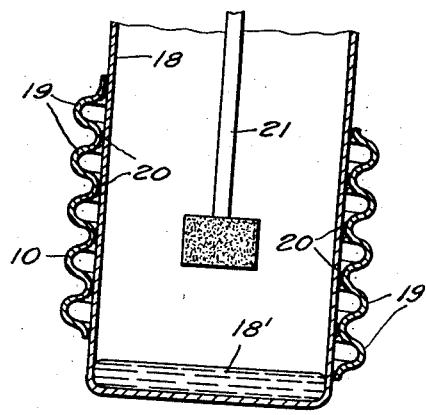
Figure 3:
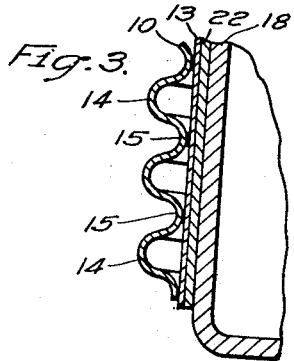
Figure 4:
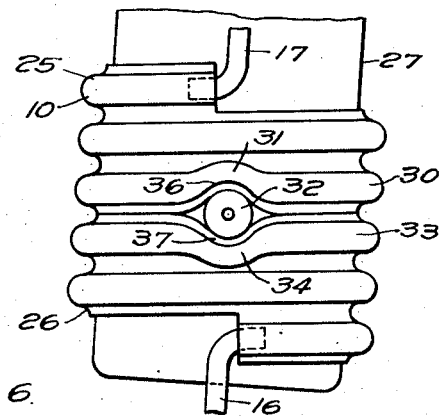
Figure 5:
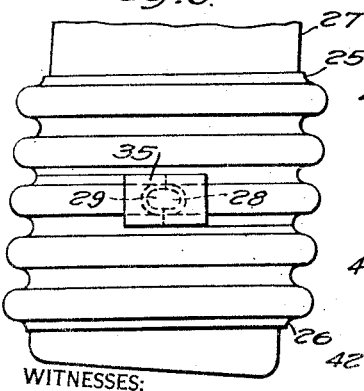
Figure 6:
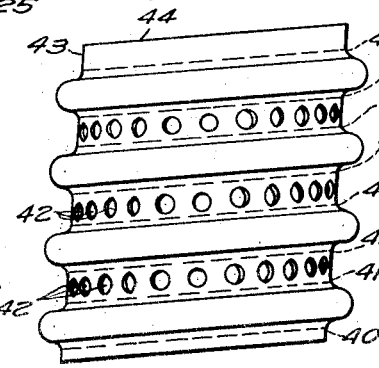
Figure 8:
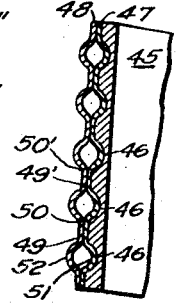
Figure 7:

Other objects and advantages of my invention will be apparent from the following description taken in conjunction with the drawing, in which:

Figure 1 is a view partly in elevation and partly in cross section of one modification of my invention, Fig. 2 is a view partly in cross section and partly in elevation of another modification of my invention, Fig. 3 is a cross sectional view of a modification of the structure of Fig. 2, Fig. 4 is a front elevational view of my invention applied where a protuberance on the casing exists, Fig. 5 is a rear elevational view of Fig. 4, Fig. 6 is an elevational view of a still further modification of my invention, Fig. 7 is a partial view of Fig. 5 with element 35 removed, and Fig. 8 is a partial sectional view of a still further modification of the invention.

For the purposes of fabricating a cooling jacket, I desire to utilize metal members especially sheet metal members in cylindrical form and to provide a helical path for the cooling medium. For such purposes, I preferably take a sheet metal member 10, weld it into a cylinder and put a preferably continuous helical corrugation extending from the lower edge 11 around the circumference the desired number of times and spacing to terminate at the upper edge 12. These places 11 and 12 have corners as illustrated, to form a squared off termination of the corrugations. A cylindrical member 13 may be placed inside of this cylindrical member to provide a helical path for the cooling medium through the crest 14 of the corrugations and these crests are spaced from one another by the troughs 15. The troughs 15 may be welded by spot welding to the inner member 13. These spot welds may extend around the helical portion of the troughs 15 and these spot welds may be so continuous as to form a seam weld.

In place of corrugating the member 10 and then welding it to the inner cylindrical member 13, I may place the cylindrical member 10 over the member 13, preferably having the members so that the member 10 is of lighter or more flexible material than the member 13 and having a friction fit therewith. The two pieces are then spot or seam welded in a helical path in a single or double line along the troughs 15 illustrated in Fig. 1. Pressure preferably of the hydraulic type is then applied at edge 11 by means of the inlet 16 and the lighter and more flexible material 10 under this hydraulic pressure from a liquid such as water, expands into the enlargements 14 to provide a path or duct in helical form from the inlet 16 at the lower edge corner 11 to the outlet 17 at the upper edge corner 12. The spot welding is, of course, performed by utilizing electrodes on the outer and inner sides following the helical path about the tube.

If desired, the sheet member can form a cooling jacket directly on the exterior casing 18, as shown in Fig. 2. This casing may be part of a main electrode structure such as the cathode structure containing the vaporizable mercury 18' shown. The sheet metal may be formed into helical corrugations 19 and slipped over the exterior casing or main electrode structure and then spot or seam welded in the troughs 20 where they contact with the casing. If desired, the cooling jacket can also be formed by first slipping a rather tight fitting cylindrical sheath member over the exterior main electrode 18 and then forming the expanded portions 19 by hydraulic pressure therethrough similar to that previously described in Fig. 1. For the sake of clearness, I have illustrated an anode 21 in the interior of the anode 18 but it is apparent that the invention has application to any type of discharge device requiring heat transfer in connection with its casing. The invention is applicable to the exterior anode type of device.

In case it is not desired to have water or other cooling medium in direct contact with the tube wall 18, as disclosed in Fig. 2, then the sheet member 10 and the inner cylinder 13 can be slipped over the tube wall and the cylinder 13 sweated by solder 22 to the tube wall 18, as disclosed in Fig. 3.

My invention also is applicable where the tube wall has a protuberance as 32 in Fig. 4 such as would be caused by a grid or starting electrode lead insulated through the cathode wall. In such a case, I provide two sheet members 25 and 26 about the tube wall 27. These two members may have the helical corrugations preformed therein or may have them subsequently formed by the hydraulic pressure method previously described.

The corrugations will, if preformed therein, terminate adjacent one another, and it is preferred that they have interfitting corners as illustrated at 28 and 29, Figs. 5 and 7. A continuous portion of the coil 30 at the lower edge of the member 25 is bent upward at 31 to curve around the protuberance 32. The coil 33 of the adjacent edge portion of the member 26 is likewise curved around the protuberance 32 at 34. The two ends of the corrugations at 28 and 29 are cut off on an angle of about 45° as illustrated in Fig. 7. A member 35 curved to fit over the V-shaped cut in the two coils is placed thereover and welded thereto.

If desired, the two members 25 and 26 may be separate members of a cylindrical form frictionally fitting on the tube 27 and having cut out portions to fit around the protuberance 32. The member 35 in the form of a plate could then be welded over that portion of the members or the members could be so cut as to form adjacent edges that could be welded together. A helical spot or seam weld in single or double line could then extend around the circumference of the two members in a helical path. This spot or seam weld would curve around the protuberance at 36 and 37. Hydraulic pressure could then be applied at 16 and 17 to expand the casings 25 and 26 into the helical ducts for the cooling medium.

Another modification is illustrated in Fig. 6, in which a double helical spot and seam weld is illustrated by the dotted lines 40, 41, 40', 41', 40'' and 41'', 40''' and 41'''. 40, 40', 41'' and 40''' are continuations of the same helical spot or seam weld. 41, 41', 41'', 41''' are likewise continuations of the same helical spot or seam weld. The portion between the welds 40 and 41 and also between 40' and 41', etc., are enlarged into cooling ducts by hydraulic pressure. The material of the intermediate portion between 41 and 40', 41' and 40'', etc., is removed by making a series of openings 42 therein, thus making a cooling coil cylindrical member with open sides.

This particular modification has many specific applications, such as where it is desired to cool the space about an anode of a discharge device. These cooling ducts may be formed on a tubular member 44 surrounding the space around the anode and the openings 42 provide a ready passage for the electrons to the anode within.

In Fig. 8, I have disclosed a still further modification of my invention. The member 45 which may be a main electrode structure such as a cup wall containing the mercury, may have grooves 46 therein, preferably in the form of a continuous helical groove. Two members 47, 48 in sheet form conforming to the shape of member 45 are slipped over the casing 45. These sheets are then spot or seam welded to the smooth part of the casing and preferably in a double seam weld at 49 and 50 extending in a continuous helix as at 49' and 50' adjacent the edges of the grooves 46. Hydraulic pressure is then applied between the two members 47 and 48 with the result that member 47 expands into the grooves 46 at 51. The member 48 may be of a stiffer material or thickness as not to be expanded but preferably it is likewise expanded at 52 to form an enlarged duct for the cooling medium 7.

While I have shown and described several preferred modifications of my invention, it is apparent that additional modifications thereof may be made without departing from the spirit of my invention. Accordingly, I desire only such limitations to be imposed upon the following claims as are necessitated by the prior art.

I claim as my invention:

The method of assembling a cooling jacket on a device having a protuberance which comprises forming helical coils in two members, bending one of the coils along the edge of one member around part of said protuberance, bending the adjacent coil portion in the other member around the other part of said protuberance and joining the coils of the two members.

JOHN W. DAWSON.